US010728710B2

(12) United States Patent
Siddiqui et al.

(10) Patent No.: US 10,728,710 B2
(45) Date of Patent: Jul. 28, 2020

(54) SYSTEMS AND METHODS FOR HANDLING RF RESOURCES BETWEEN A MBMS STACK AND A NON-MBMS STACK IN A DSDS DEVICE

(71) Applicant: Samsung Electronics Co., Ltd., Suwon-si, Gyeonggi-do (KR)

(72) Inventors: Tariq Siddiqui, Bangalore (IN); Vinay Kumar Shrivastava, Bangalore (IN); Rohan Raj, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 414 days.

(21) Appl. No.: 15/581,125

(22) Filed: Apr. 28, 2017

(65) Prior Publication Data

US 2018/0176888 A1    Jun. 21, 2018

(30) Foreign Application Priority Data

Dec. 20, 2016   (IN) .............................. 201641043541

(51) Int. Cl.
   *H04L 12/58*   (2006.01)
   *H04W 4/06*    (2009.01)
   *H04L 12/18*   (2006.01)

(52) U.S. Cl.
   CPC ............. *H04W 4/06* (2013.01); *H04L 12/189* (2013.01)

(58) Field of Classification Search
   None
   See application file for complete search history.

(56) References Cited

U.S. PATENT DOCUMENTS

| 9,578,473 | B1 * | 2/2017 | Ponukumati | ............ H04W 4/12 |
| 2016/0174195 | A1 * | 6/2016 | Lee | ........................ H04L 67/06 |
| | | | | 370/312 |
| 2017/0079062 | A1 * | 3/2017 | Sabbarini | .............. H04L 1/0051 |
| 2018/0063880 | A1 * | 3/2018 | Bhardwaj | ............. H04W 76/19 |

* cited by examiner

*Primary Examiner* — Zewdu A Beyen
(74) *Attorney, Agent, or Firm* — Harness, Dickey & Pierce, P.L.C.

(57) ABSTRACT

Systems and/or methods for handling Radio Frequency (RF) resources between a Multimedia Broadcast Multicast Services (MBMS) stack and a non-MBMS stack in a Dual SIM Dual Standby (DSDS) device. The method includes operations of receiving, by an arbitrator module, an MBMS configuration from the MBMS stack, calculating, by the arbitrator module, one or more available RF occasions and a duration of each of the one or more RF occasions based on MBMS configuration, updating the non-MBMS stack information on the availability of the one or more RF occasions along with the corresponding durations in absolute time, and receiving information from the non-MBMS stack on completion of operations utilizing the one or more available RF occasions.

18 Claims, 8 Drawing Sheets

SYSTEMS AND METHODS FOR HANDLING RF RESOURCES BETWEEN A MBMS STACK AND A NON-MBMS STACK IN A DSDS DEVICE

PRIORITY

This application claims priority under 35 U.S.C. § 119(a) to Indian Complete Patent Application Serial No. 201641043541 (CS), which was filed on Dec. 20, 2016 in the Indian Intellectual Property Office, the entire disclosure of which is incorporated herein by reference.

TECHNICAL FIELD

The present invention generally relates to telecommunication and particularly relates to systems and/or methods for handling Radio Frequency (RF) resources between a Multimedia Broadcast Multicast Services (MBMS) stack and a non-MBMS stack in a Multiple Subscriber Identity Module (Multi-SIM) device.

BACKGROUND

In multi-stack scenarios, each stack requests radio frequency (RF) resources at its respective requirement instances without any cooperation between the stacks. Hence, for a large duration, the RF resources may be unused. Then, multiple stacks may simultaneously request RF resources for multimedia broadcast multicast service (MBMS) reception which degrades MBMS reception quality. However, these stacks, through agreement, could have used the RF resources during non-MBMS free occasions, thereby increasing the "Multicast-Broadcast Single-Frequency Network (MBSFN) RF Request Hit ratio". The MBSFN RF Request Hit Ratio is determined as the ratio of the number of times/occasions the RF is availed and utilized for MBMS service reception to the total number of the times/occasion an RF request is made to receive MBMS service.

Further, MBMS in Long-Term Evolution (LTE) may be used for broadcasting infotainment services over a coverage area utilizing MBSFN techniques to connect with a large number of user equipment (UEs). These services include audio streaming, video streaming, text, alerts, download services, etc. The Dual Stack Dual SIM (DSDS) solution at the UE caters to different Radio Access Techniques (RATs) like LTE, 3 G, 2 G, and the like, together using common RF resources. For example, a DSDS UE may operate a packet switching (PS) service with an LTE RAT on a first SIM and a voice service on 2 G on a second SIM.

In order to support paging/measurements, the UE needs to pause one stack and provide RF resources to another stack periodically or on an as-needed basis. This may cause some interruptions or degradation of service on the interrupted stack. The UE receiving MBMS on LTE (first stack) will get interrupted by tuning away from the LTE network to decode a paging message on Global System for Mobile Communications (GSM) (second stack).

The MBMS service reception may become degraded and the user may perceive a reduction in quality. Based on RF black out time (paging decode causes periodic gaps, measurement gaps are relatively long), quality of service (QoS) and quality of experience (QoE) may be negatively affected. Also, loss of Multicast Channel (MCH) scheduling information (MSI), which is provided only once in the entire scheduling period may also cause problems.

SUMMARY OF THE INVENTION

In view of the foregoing, example embodiments provide methods that address the issue of poor RF utilization when MBMS is being received on one stack along with another active stack(s). Further, example embodiments provide for methods that resolve RF starvation problems for a MBMS stack and other active stacks through an effective RF resources sharing algorithm with the help of an arbitrator. Example embodiments also provide for methods that handle MBMS operation more efficiently by the UE in a DSDS environment.

The various example embodiments of the present invention disclose systems and/or methods for handling Radio Frequency (RF) resources between a Multimedia Broadcast Multicast Services (MBMS) stack and a non-MBMS stack in a multi-SIM device, for instance, a Dual SIM Dual Standby (DSDS) device.

According to example embodiments of the present invention, methods for handling Radio Frequency (RF) resources between a Multimedia Broadcast Multicast Services (MBMS) stack and a non-MBMS stack in a Dual SIM Dual Standby (DSDS) are provided. The methods include the operations of receiving, by an arbitrator module, an MBMS configuration from a MBMS stack, calculating, by the arbitrator module, one or more available RF occasions and a duration of each of the one or more RF occasions based on MBMS configuration, updating non-MBMS stack information on the availability of the one or more RF occasions along with the corresponding durations in absolute time, and receiving information from the non-MBMS stack on completion of operations utilizing the one or more available RF occasions. Through the use of the methods described above, RF resources are efficiently shared between the MBMS stack and the non-MBMS stack.

According to example embodiments of the present invention, a Dual SIM Dual Standby (DSDS) device for handling Radio Frequency (RF) resources is provided. The DSDS device includes a memory having a Multimedia Broadcast Multicast Service (MBMS) stack configured to store a MBMS configuration and a non-MBMS stack configured to store a non-MBMS configuration. The DSDS device further includes one or more subscriber identity modules (SIMs). The DSDS device further includes a transceiver for transmitting and receiving signals and data packets associated with the MBMS stack and the non-MBMS stack. The DSDS device further includes an arbitrator module configured to: receive the MBMS configuration from the MBMS stack, calculate one or more available RF occasions and a duration for each of the one or more RF occasions based on the MBMS configuration, update the non-MBMS stack information on the availability of the one or more RF occasions along with the corresponding durations in absolute time, and receive information from the non-MBMS stack on completion of operations utilizing the one or more available RF occasions. The DSDS device further includes a recovery module configured to: receive control of RF resources from the non-MBMS stack, determining a decode miss for the MSI during a RF tuned away period based on timing information, and sending a signal indicating the decode miss for the MSI to a Medium Access Control (MAC) along with a current system timing. Through the use of the above described DSDS device, RF resources are efficiently shared between the MBMS stack and the non-MBMS stack. Also, through the use of the above described DSDS device, decode misses are detected and provided to the MAC for mitigation.

The foregoing has outlined, in general, various aspects of the invention and is to serve as an aid to better understand the more complete detailed description which is to follow. In reference to such, there is to be a clear understanding that the present invention is not limited to the methods or applications of use described and illustrated herein. It is intended that any other advantages and objects of the present invention that become apparent or obvious from the detailed description or illustrations contained herein are within the scope of the present invention.

BRIEF DESCRIPTION OF THE DRAWINGS

Other objects, features and advantages will occur to those skilled in the art from the following description of some example embodiments and the accompanying drawings, in which.

Figure 1:
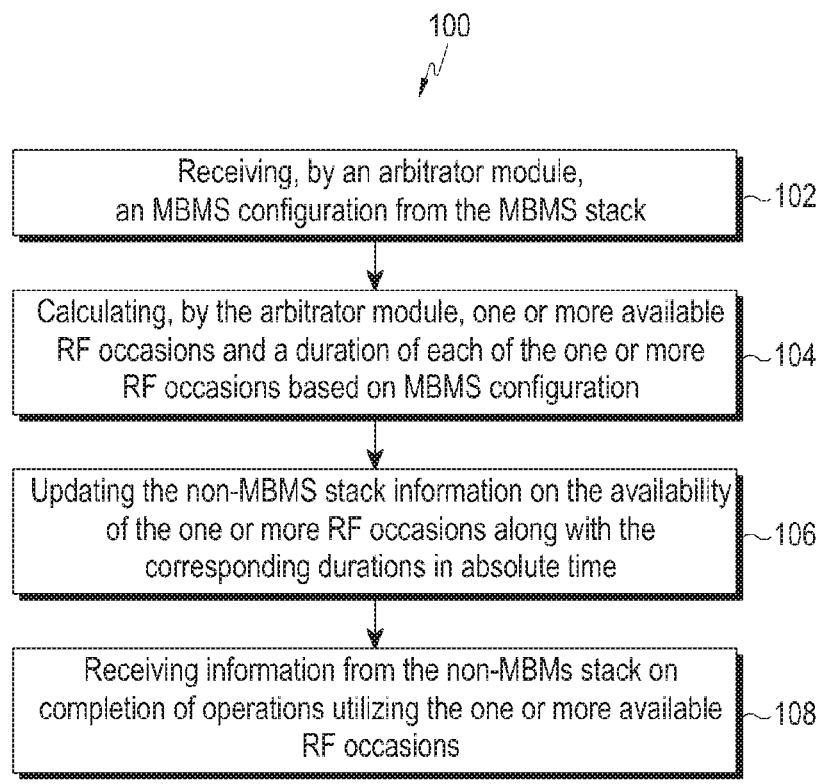
FIG. 1 is a flow diagram illustrating a method for handling Radio Frequency (RF) resources between a Multimedia Broadcast Multicast Services (MBMS) stack and a non-MBMS stack in a Dual SIM Dual Standby (DSDS) device according to an example embodiment.

Although specific features of the present invention are shown in some drawings and not in others, this is done for convenience only as each feature may be combined with any or all of the other features in accordance with the present invention.

DETAILED DESCRIPTION

The present invention provides systems and methods for handling Radio Frequency (RF) resources between a Multimedia Broadcast Multicast Services (MBMS) stack and a non-MBMS stack in a Dual SIM Dual Standby (DSDS) device. In the following detailed description of example embodiments of the invention, reference is made to the accompanying drawings that form a part hereof, and in which are shown by way of illustration example embodiments in which the invention may be practiced. These example embodiments are described in sufficient detail to enable those skilled in the art to practice the invention, and it is to be understood that other example embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" example embodiment(s) in several locations. This does not necessarily imply that each such reference is to the same example embodiment(s), or that the feature only applies to a single example embodiment. Single features of different example embodiments may also be combined to provide other example embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The example embodiments herein and the various features and advantages details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The examples used herein are intended merely to facilitate an understanding of ways in which the example embodiments herein can be practiced and to further enable those of skill in the art to practice the example embodiments herein. Accordingly, the examples should not be construed as limiting the scope of the example embodiments herein.

According to an example embodiment of the present invention, systems and methods for handling Radio Frequency (RF) resources between a Multimedia Broadcast Multicast Services (MBMS) stack and a non-MBMS stack in a Dual SIM Dual Standby (DSDS) device are described herein. The DSDS device described herein may be any electronic device with dual SIM or multi SIM capability, such as, but not limited to, a mobile phone, PDA, tablet, and the like, without departing from the scope of the invention.

According to the present invention, the methods include an arbitrator module receiving a Multimedia Broadcast Multicast Services (MBMS) configuration from a MBMS stack. The DSDS device includes the MBMS stack and a non-MBMS stack. The MBMS stack stores the configuration settings for establishing and handling point to multipoint communication. The arbitrator module of the DSDS device receives the MBMS configuration from the MBMS stack, which also stores information about multiple processes that are to be executed.

In an example embodiment of the present invention, the MBMS configuration settings refer to at least one of, but not limited to, cross-layer communication between a MBMS based device application and a modem for MBMS, user service Quality of Experience (QoE) with regard to delay, latency and video quality; application/service level configuration parameters comprising at least one of FEC (forward error correction) capability, file repair capability, service nature such as streaming/download, and unicast connection capability for devising efficient arbitration for RF scheduling among the MBMS and non-MBMS stacks, and the like, without departing from the scope of the invention.

Further, the methods include the arbitrator module calculating one or more available RF occasions and a duration of each of the one or more RF occasions based on the MBMS configuration. Upon receiving the configuration information from the MBMS stack, the arbitrator module identifies the occasions when the DSDS device has reserved RF resources and calculates the available RF occasions and duration of each of the one or more RF occasions. In an embodiment of the present invention, the arbitrator module employs a priority mechanism comprising one of MBMS scheduling information, a MBMS control channel and MBMS traffic in a desired order to enable efficient reception.

Further, the methods include updating the non-MBMS stack information on the availability of the one or more RF occasions along with corresponding durations in absolute time. Based on the identified RF occasions, the arbitrator module of the DSDS device identifies one or more available RF occasions which are available for non-MBMS configuration and processes. The identified one or more available RF occasions along with the corresponding durations in absolute time are updated in the non-MBMS stack.

Further, the methods include receiving information from the non-MBMS stack on completion of operations utilizing the one or more available RF occasions. The non-MBMS stack is updated and based on the updated information, the DSDS device executes processes present in the non-MBMS stack during available RF occasions. The arbitrator module receives the information from the non-MBMS stack upon completion of the operation of executing the processes from the non-MBMS stack during available RF occasions.

In an example embodiment of the present invention, the methods further include providing idle/connected Discontinuous Reception (DRX) parameters including, but not limited to, DRX and eDRX cycle information for enabling efficient RF scheduling between the MBMS stack, the non-MBMS stack, and the like to the arbitrator module. Further, the methods include updating the arbitrator module regarding unscheduled multicast traffic channel (MTCH) services to prevent any RF requests thereby reducing RF resource utilization.

In an example embodiment of the present invention, the methods further include the DSDS device avoiding data loss during MBMS operation by applying MBMS scheduling information if a MCH Scheduling information (MSI) decode miss occurs due to RF resources tuning away.

According to an example embodiment of the present invention, handling data loss during MBMS operation comprises a recovery module of the DSDS device receiving RF resources from the non-MBMS stack. Further, the methods include determining, by the recovery module, a decode miss for the MSI while RF resources are tuned away based on a timing information. Further, during the determining, the recovery module identifies the decode miss, and thus sends a signal indicating the decode miss for the MSI to a Medium Access Control (MAC) along with a current system timing. Further, upon receiving the indication from the recovery module about missing the MSI, the MAC generates a new MSI using a provided MSI configuration.

Further, the methods include the MAC providing the MBMS scheduling information (MSI) to decode MBMS data packets based on the current system timing and presently active services. Further, the methods include the MBMS stack transmitting a request for RF resources to the arbitrator module based on the provided MSI configuration.

According to another example embodiment of the present invention, handling data loss during MBMS operation further comprises the recovery module receiving control of one or more RF resources from the non-MBMS stack. Based on the available RF resources, the recovery module determines if the present system time has crossed over a MBMS scheduling information (MSI) occurrence. If the system time has crossed the MSI occurrence, then the recovery module sends a signal to the MAC indicating the loss of MSI.

Further, the methods include the MBMS stack sending a request for RF resources to an arbitrator module for the available scheduling period. As a portion of the RF resources are occupied with the processes from the non-MBMS stack, the MBMS stack identifies the RF resources which are available for the processes in the MBMS stack for the available scheduling period. Further, the recovery module decodes the MBMS data packets until a new MSI configuration is received from the MAC. The MAC checks for interested services that requires RF resources, and discards the MBMS data packets which are not pertaining to the interested services. Further, the methods include the MAC processing MBMS data packets related to the interested services.

According to another example embodiment of the present invention, handling data loss during MBMS operation further comprises a recovery module determining if there is any decode miss for the MSI while the RF resources are tuned away based on current timing information once the recovery module receives control of RF resources from non-MBMS stacks. Further, the methods include sending an indication to the MAC about the decode miss for the MSI along with current system timing if there is a loss of MSI. The MAC uses stored MBMS scheduling information either partly or fully to decode the MBMS data packets based on the current system timing and presently active services.

Further, the methods include the MAC receiving the decoded data from the recovery module. If the decoded data is not for any of the active services, then the MAC discards the MBMS data packets. Further, the methods include the MAC determining the suitability of applied MSI based on a threshold number of discards. If the number of discards is more than the threshold number, then according to the present invention, the MAC indicates to the recovery module to apply blind decoding for MBMS data.

According to another example embodiment of the present invention, handling data loss during MBMS operation further includes the DSDS device informing a network about MBMS operation status. Further, the methods include the DSDS device transmitting an MSI information request message to the network when a decode miss of MSI is identified while the RF resources are tuned away. Further, based on the transmitted MSI information request message, the DSDS device receives the MSI information over a unicast channel from the network.

In an example embodiment of the present invention, the decoding of MBMS includes at least one of, but not limited to, using at least one of a stored MSI value based on current active services and current system timing or a newly computed MSI value given by the MAC for decoding of the MBMS data. Decoding of MBMS data further includes applying a blind decode method if the MSI is missed at the MSI occasion, stopping the blind decode method and releasing the RF resources for other stack operation if permitted, if the MSI indicates an un-scheduled MTCH occasion; applying blind decoding if the MSI is missed following the MBMS scheduling period, and the like, without departing from the scope of the invention.

According to another example embodiment of the present invention, handling data loss during MBMS operation further includes computing timing information of the next scheduled MSI occasion of the current service by a first stack, which is receiving MBMS data packets. Further, the methods include the first stack releasing RF resources for use by a second stack during the MBMS idle period. Further, the methods include updating the timing information associated with next scheduled MSI occasion to the second stack. Further, the methods include releasing by the second stack the RF resources before expiry of the MSI occasion, wherein each of the first stack and the second stack is one of an MBMS stack and a non-MBMS stack.

According to another example embodiment of the present invention, handling data loss during MBMS operation further comprises receiving by the recovery module, a reserved value from the MAC indicative of a current running service if the running service is not scheduled for the MSI periodicity.

FIG. 1 is a flow diagram 100 illustrating a method for handling Radio Frequency (RF) resources between a Multimedia Broadcast Multicast Services (MBMS) stack and a non-MBMS stack in a Dual SIM Dual Standby (DSDS) device according to an example embodiment of the present invention. According to flow diagram 100, at operation 102, an arbitrator module receives a MBMS configuration from a MBMS stack. Further, at operation 104, the arbitrator module calculates one or more available RF occasions and a duration of each of the one or more RF occasions based on the MBMS configuration. Further, at operation 106, the arbitrator module updates non-MBMS stack information on the availability of the one or more RF occasions along with the corresponding durations in absolute time. Further, at operation 108, the arbitrator module receives information from the non-MBMs stack on completion of operations utilizing the one or more available RF occasions.

According to the present invention, an arbitrator module of a DSDS device efficiently handles RF scheduling requests of the MBMS stack and other stacks. The arbitrator module checks for available RF occasions, and performs timing and duration calculations based on current MBMS configurations. The arbitrator module provides an opportunity to the non-MBMS stack, based on calculated RF available occasions, for RF usage to avoid monopolization of RF resources by the MBMS stack. Further, the present invention discloses utilizing MBMS user service quality of experience (QoE), application/service level configuration parameters like FEC (forward error correction), and service nature such as streaming/download for devising arbitration, and the like, for RF scheduling among MBMS and non-MBMS stacks.

Figure 2:
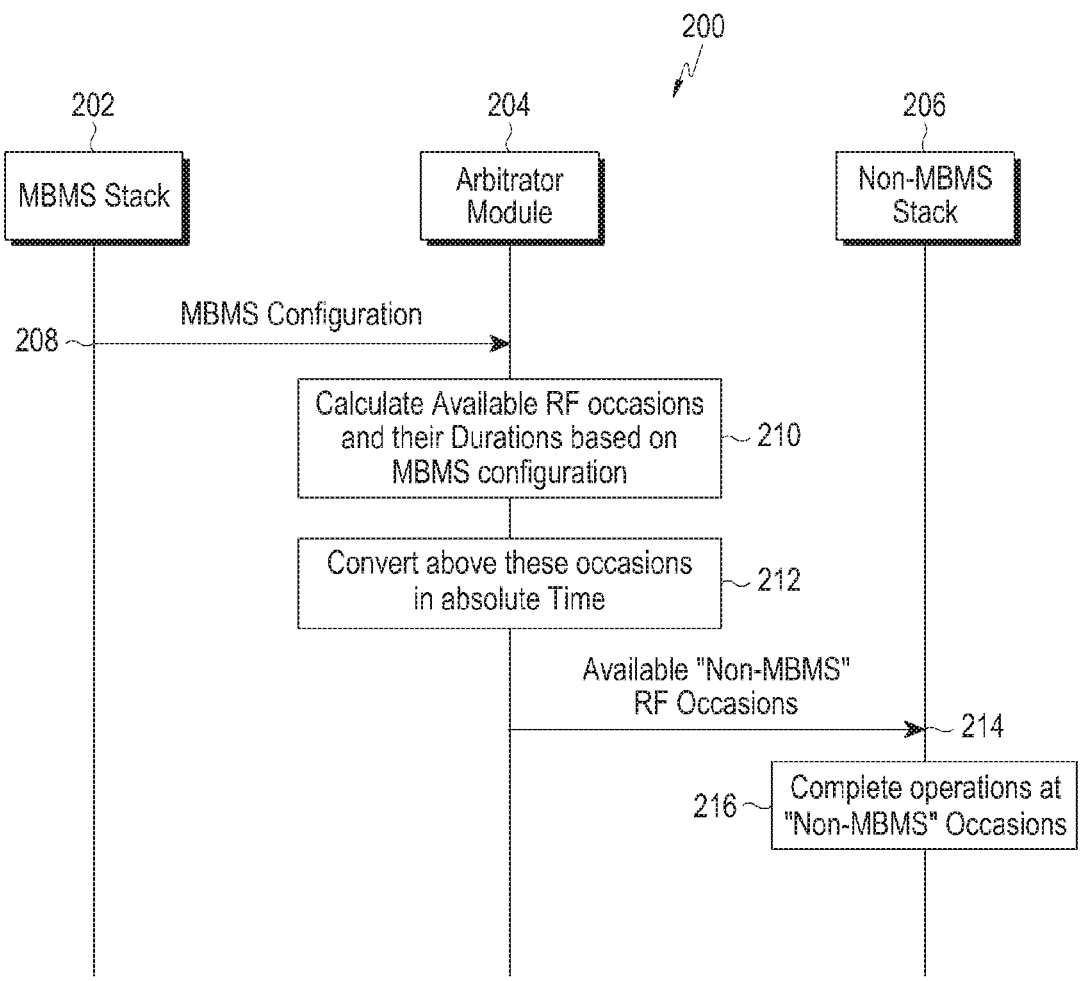
FIG. 2 is a schematic flow chart illustrating operations performed by a Multimedia Broadcast Multicast Services (MBMS) stack, an arbitrator module, and a non-MBMS stack in a Dual SIM Dual Standby (DSDS) device to execute a method for handling Radio Frequency (RF) resources according to an example embodiment.

FIG. 2 is a schematic flow chart 200 illustrating operations performed by a Multimedia Broadcast Multicast Services (MBMS) stack, an arbitrator module, and a non-MBMS stack in a Dual SIM Dual Standby (DSDS) device to execute a method for handling Radio Frequency (RF) resources according to an example embodiment of the present invention. According to FIG. 2, flow chart 200 includes a MBMS stack 202, an arbitrator module 204, and a non-MBMS stack 206. According to flow chart 202, at operation 208 MBMS stack 202 transmits MBMS configuration data to arbitrator module 204. Based on the received MBMS configuration data, at operation 210, arbitrator module 204 calculates available RF occasions and their respective durations. At operation 212, arbitrator module 204 converts the RF occasions into absolute time. Based on the converted absolute time, arbitrator module 204 identifies the RF occasions which are occupied by MBMS stack processes and RF occasions that are available for the non-MBMS stack, and thus at operation 214, provides available non-MBMS occasions to non-MBMS stack 206. Upon receiving the RF occasions, at operation 216, non-MBMS stack 206 completes the execution of the processes during the available RF occasions.

In an example embodiment of the present invention, the MBMS stack updates the MBSFN configuration with the arbitrator module. In an example embodiment of the present invention, the MBMS configuration also involves cross-layer communication between an MBMS application and a modem for MBMS, user service QoE and application/service level configuration parameters such as, but not limited to, FEC (forward error correction), file repair, service nature such as streaming/download, unicast capability for devising arbitration, and the like, for RF scheduling among MBMS and non-MBMS stacks, without departing from the scope of the invention.

The arbitrator module uses the MBMS configuration to calculate possible occasions and their durations where RF resources will not be used by the MBMS stack, and converts the MBSFN configuration into absolute time. The arbitrator module may request RF resources with higher priority when MSI, Multicast Control Channel (MCCH) and Change Notification are scheduled. However, the arbitrator module can afford to lose MTCH data, if high priority activity is planned for the non-MBMS stack.

In an example embodiment of the present invention, other attributes such as, but not limited to, idle/connected DRX and eDRX cycle info, and the like, may be provided to the arbitrator module so that the attributes may be used to enable the arbitrator module to perform efficient RF scheduling between the MBMS stack and the non-MBMS stack. In another example embodiment of the present invention, the arbitrator module may also be updated with an unscheduled MTCH (i.e., MSI indicating reserved field), so that unwanted RF requests may be avoided. According to the present invention, the arbitrator module updates the non-MBMS stack about the number of available RF occasions along with their duration in the near future in terms of absolute time.

Based on the obtained information about available RF occasions in terms of absolute time, the non-MBMS stack improves the efficiency of its operation and tries to complete its entire operation during the available RF occasions. This also includes the approach wherein the non-MBMS stack divides its activity into a plurality of sub-parts and executes one or more of the sub-parts in different RF occasions to meet the available RF resources. Hence, the non-MBMS stack effectively utilizes the RF resources and increases the MBMS RF Hit Ratio during MBSFN occasion RF requests. In an example embodiment of the present invention, there may be continuous feedback between the arbitrator module and both the stacks to maintain synchronicity.

Figure 3:
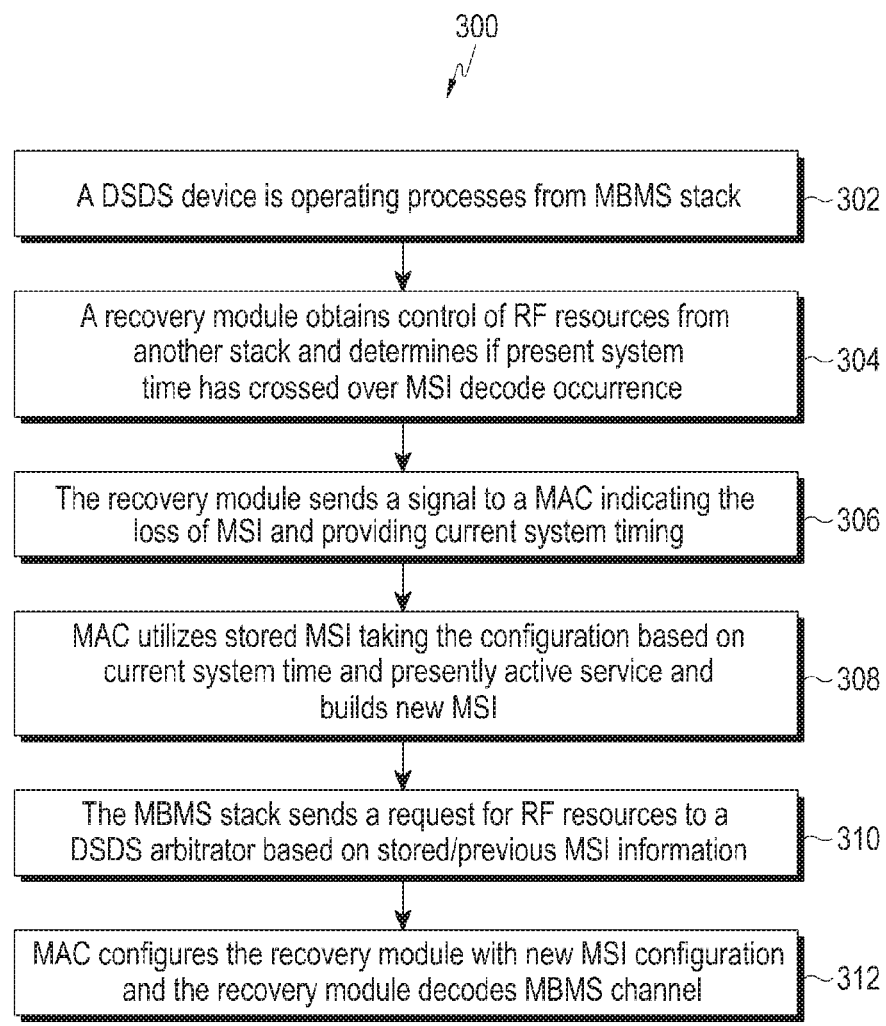
FIG. 3 is a flow diagram illustrating a method for handling data loss, using a stored MSI approach, during Multimedia Broadcast Multicast Services (MBMS) operation in a Dual SIM Dual Standby (DSDS) device according to an example embodiment.

FIG. 3 is a flow diagram 300 illustrating a method for handling data loss during Multimedia Broadcast Multicast Services (MBMS) operation in a Dual SIM Dual Standby (DSDS) device according to an example embodiment of the present invention. The flow diagram illustrates a scheme for handling data loss using a stored MSI approach. According to flow diagram 300, at operation 302, the DSDS device is performing processes from the MBMS stack. At operation 304, a recovery module of the DSDS device receives control of the RF resources from the non-MBMS stack and determines a decode miss for MSI, while the RF resources are tuned away, based on system timing information. In an example embodiment of the present invention, the recovery module may infer this future decode miss for MSI before the RF resources actually tune away.

At operation 306, the recovery module sends a signal to the MAC indicating the decode miss for MSI and providing current system timing. At operation 308, the MAC utilizes the stored or old MSI and suitably selects the relevant part as applicable based on the current system timing provided by the recovery module and presently active services. Based on the selected information, the MAC configures and provides the recovery module with MBMS scheduling information to decode MBMS data. At operation 310, an LTE stack prepares an RF request to the DSDS arbitrator module based on the stored/previous MSI. At operation 312, the MAC configures the recovery module with a new MSI configuration and the recovery module decodes the MBMS channel.

Figure 4:
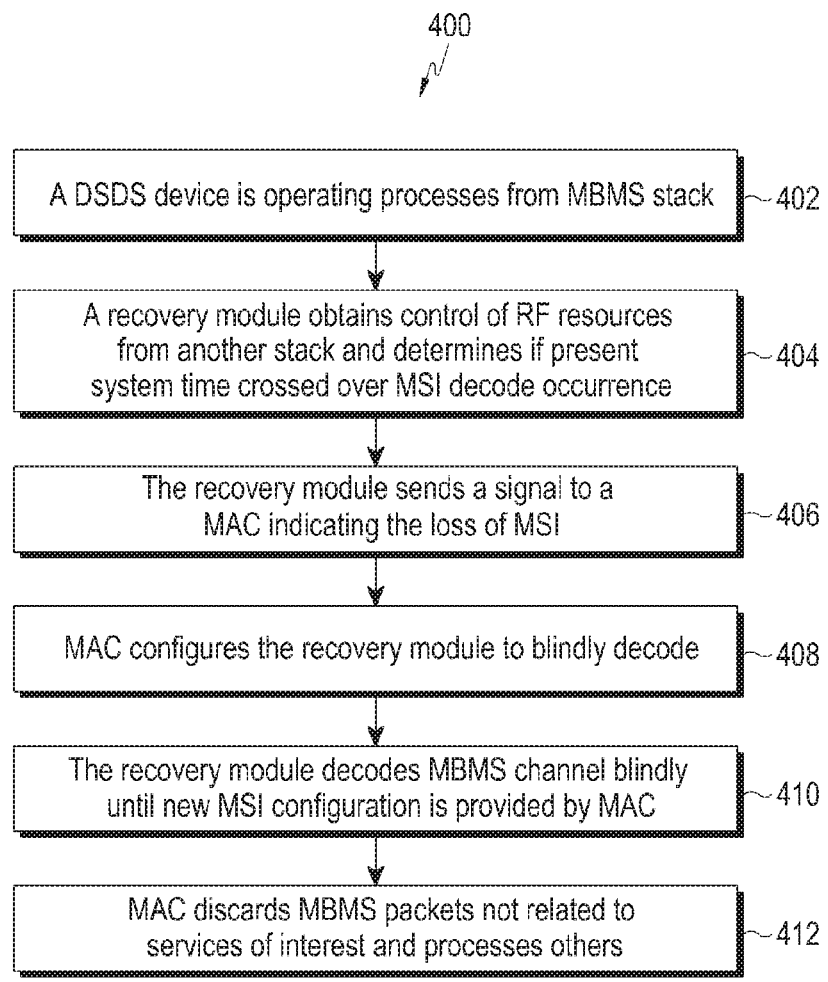
FIG. 4 is a flow diagram illustrating a method for handling data loss, using a blind decode approach, during Multimedia Broadcast Multicast Services (MBMS) operation in a Dual SIM Dual Standby (DSDS) device according to an example embodiment.

FIG. 4 is a flow diagram 400 illustrating a method for handling data loss during Multimedia Broadcast Multicast Services (MBMS) operation in a Dual SIM Dual Standby (DSDS) device according to an example embodiment of the present invention. The flow diagram illustrates a scheme for handling data loss using a blind decode approach. According to flow diagram 400, at operation 402 the DSDS device is operating processes from the MBMS stack. At operation 404, the recovery module receives control of RF resources from another stack, and determines the decode miss for MSI, while the RF resources were tuned away, based on current timing information. At operation 406, the recovery module sends a signal to the MAC indicating the decode miss for MSI.

Based on the received information from the recovery module, at operation 408, the MAC configures the recovery module to blindly decode MBMS data until a new MSI configuration is provided. A LTE stack sends a request for RF resources to the DSDS arbitrator for the entire Managed Service Provider (MSP) and, based on the provided RF resources, a Demand-side Platform (DSP) decode operation is carried out. At operation 410, the recovery module decodes the MBMS channel blindly until a new MSI configuration is provided by the MAC. At operation 412, the MAC discards MBMS packets which do not pertain to interested services and processes relevant packets.

Figure 5:
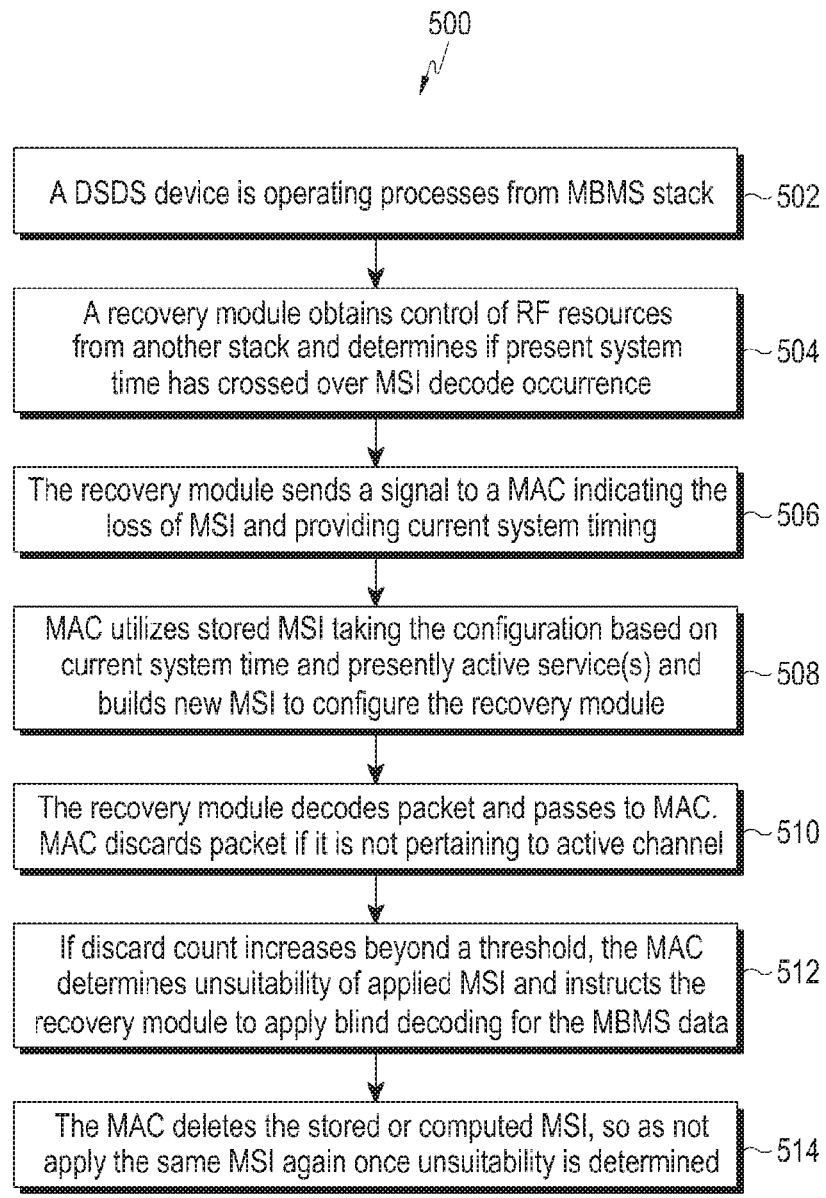
FIG. 5 is a flow diagram illustrating a method for handling data loss, using a stored/blind decode approach, during Multimedia Broadcast Multicast Services (MBMS) operation in a Dual SIM Dual Standby (DSDS) device according to an example embodiment.

FIG. 5 is a flow diagram 500 illustrating a method for handling data loss during Multimedia Broadcast Multicast Services (MBMS) operation in a Dual SIM Dual Standby (DSDS) device according to an example embodiment of the present invention. The flow diagram illustrates a scheme for handling data loss using a stored/blind decode approach. According to flow diagram 500, at operation 502 the DSDS device is performing processes from the MBMS stack. At operation 504, the recovery module receives control of the RF resources from another stack, and determines a decode miss for MSI, while the RF resources were tuned away, based on current timing information. At operation 506, the recovery module sends a signal to the MAC indicating the decode miss for MSI and provides system timing.

At operation 508, the MAC utilizes a stored/previous MSI and suitably selects the relevant part as applicable based on the current system timing provided by the recovery module and presently active services. Further, the MAC configures and provides the recovery module with the MBMS scheduling information to decode MBMS data. At operation 510, the recovery module provides the decoded data to the MAC. If the decoded data is not for any of the active services, then the MAC discards the data packet. At operation 512, based on the discard or a threshold number of discards, the MAC determines the unsuitability of the applied MSI and signals the recovery module to apply blind decoding for the MBMS data. Further, at operation 514, the MAC deletes the stored or computed MSI, so as not to apply the same MSI again once unsuitability is determined.

In another example embodiment of the present invention, if unsuitability of a stored/previous MSI is found, then the present RF cycle may be ignored until the next MSI reception. In another example embodiment, if unsuitability of a stored/previous MSI is found, then a subsequent MSI reception may be prioritized to a higher rank for an RF availing operation. In another example embodiment, if unsuitability of stored/previous MSI is found, then the stored MSI is not used any further and may be deleted. In another example embodiment, if unsuitability of stored/previous MSI is found, then blind decoding may be set as the approach for a subsequent MSI decode miss. In another embodiment, if unsuitability of stored/previous MSI is found, then the application or user may be notified of an interruption. According to the above mentioned example embodiments, if any new service is to be started in a present scheduling cycle, the start may be delayed and the delay may be indicated to the application.

According to another example embodiment, during resumption example embodiments, the different MSI decode miss handling approaches described earlier may be applied on a conditional basis. For example, following resumption of MBMS after a call end state is reached on another stack, the time elapsed for the stored MSI information is determined. If the time elapsed is greater than a threshold, blind decoding may be applied. Otherwise, a stored MSI is applied and MBMS decoding is attempted.

Figure 6:
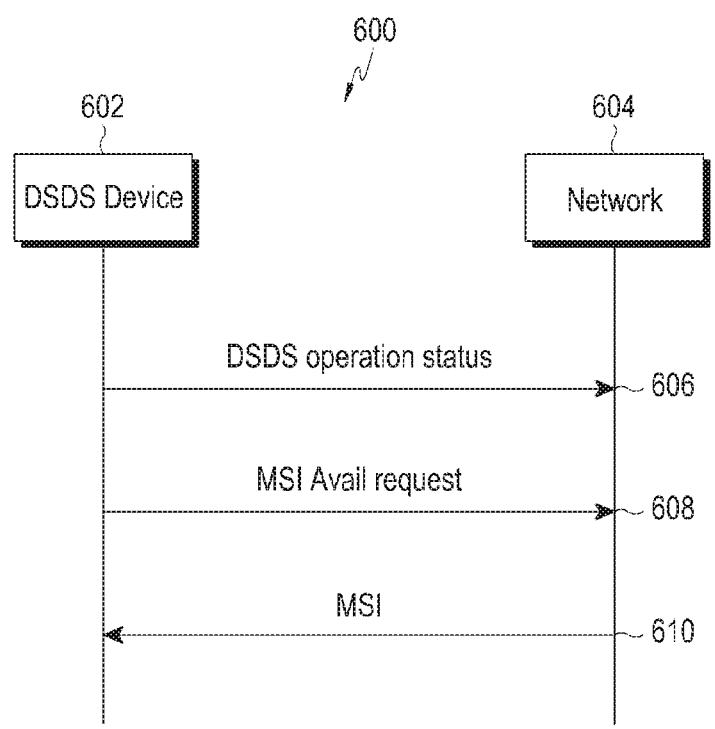
FIG. 6 is a schematic flow chart illustrating operations performed between a Dual SIM Dual Standby (DSDS) device and a network to execute a method for handling data loss during Multimedia Broadcast Multicast Services (MBMS) operation in the DSDS device according to an example embodiment.

FIG. 6 is a schematic flow chart 600 illustrating a method for handling data loss during Multimedia Broadcast Multicast Services (MBMS) operation in a Dual SIM Dual Standby (DSDS) device according to an example embodiment of the present invention. Flow chart 600 illustrates an example embodiment for network based handling of data loss wherein a DSDS device 602 is communicating with a network 604. MSI information is repeated more than one time in the MCH scheduling period by the network and the repetitions may be configured for the occurrences. According to flow chart 600, at operation 606, the DSDS device informs network 604 about its DSDS operation status. Based on the information provided to network 604, DSDS device 602 requests MSI information through unicast mode when a decode miss of MSI is identified because the RF resources tune away. When the decode miss is identified, DSDS device 602 is in idle state. In order to receive MSI information through unicast mode, DSDS device 602 sets up a new Radio Resource Control (RRC) connection, which involves doing a Random Access Channel (RACH) operation. At operation 608, DSDS device 602 sends an MSI information request message to network 604. At operation 610, network 604 provides the MSI information on a unicast channel to DSDS device 602.

Figure 7:
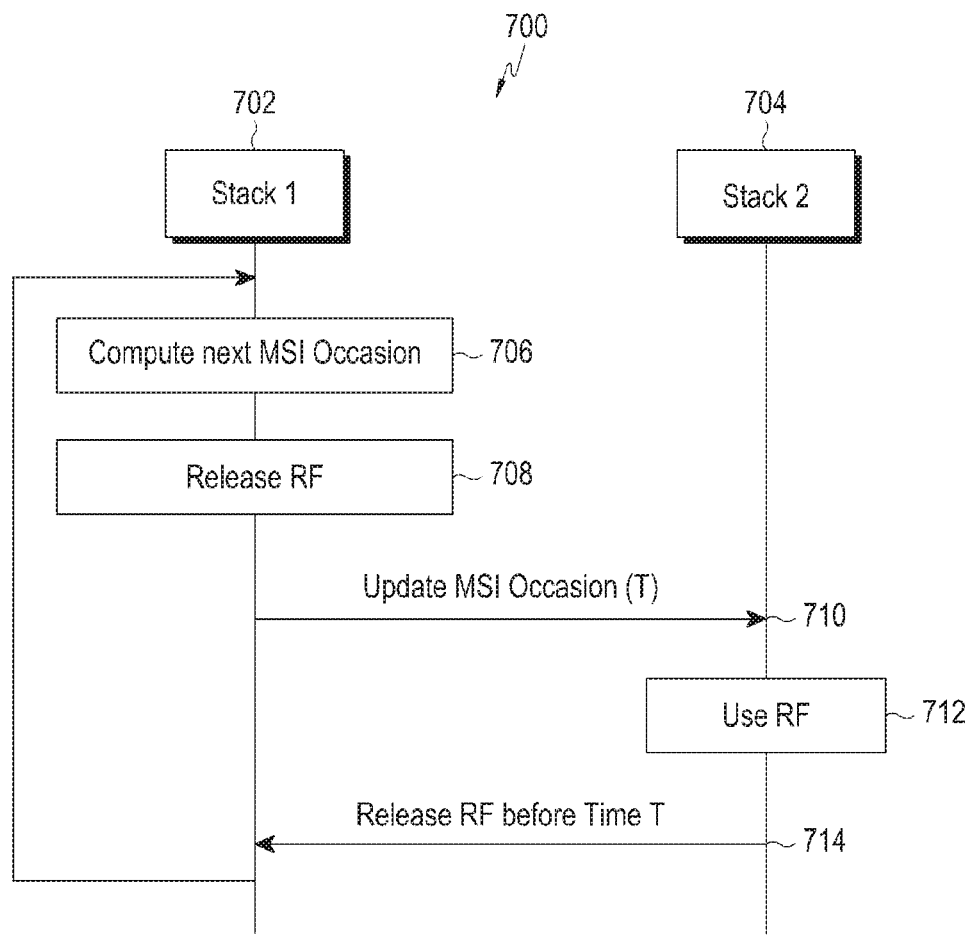
FIG. 7 is a schematic flow chart illustrating operations performed between two stacks to execute a method for handling data loss during Multimedia Broadcast Multicast Services (MBMS) operation in a Dual SIM Dual Standby (DSDS) device according to an example embodiment.

FIG. 7 is a schematic flow chart 700 illustrating a method for handling data loss during Multimedia Broadcast Multicast Services (MBMS) operation in a Dual SIM Dual Standby (DSDS) device according to an example embodiment of the present invention. Flow chart 700 illustrates an example embodiment for update timer based handling of data loss between a stack 1 702 and a stack 2 704, wherein each of stack 1 702 and stack 2 704 may be a MBMS or a non-MBMS stack, without departing from the scope of the invention.

According to flow chart 700, at operation 706, stack 1 702 receives MBMS, and computes the timing information of the next scheduled MSI occasion of the running service. At operation 708, stack 2 704 wishes to use the RF resources and thus the stack 1 702 releases the RF resources to stack 2 704. At operation 710, stack 1 702 provides control of the RF resources to stack 2 704 along with the computed next scheduled MSI occasion in absolute time. At operation 712, stack 2 704 uses the RF resources for the absolute time period mentioned by stack 1 702 and at operation 714, releases control of the RF resources to stack 1 702 before expiry of the absolute time.

According to another example embodiment, a certain running service may be unscheduled for the whole MSI periodicity which is indicated by a reserved value (i.e., stop MTCH: 2047). In such cases, the MAC provides the reserved value to the recovery module to indicate that the certain running service (MTCH) is not scheduled in the MSP. The operations of the recovery module may be defined as follows:

If the MSI is missed at the MSI occasion, then a new computed MSI value may be used by the MAC or the blind decode method as discussed herein above may be used.

If the MSI indicates an un-scheduled MTCH occasion, then the blind decode method may be stopped and control of the RF resources may be released for use by another stack if permitted.

If the MSI is missed in following up MSP, the blind decode method may be applied.

Figure 8:
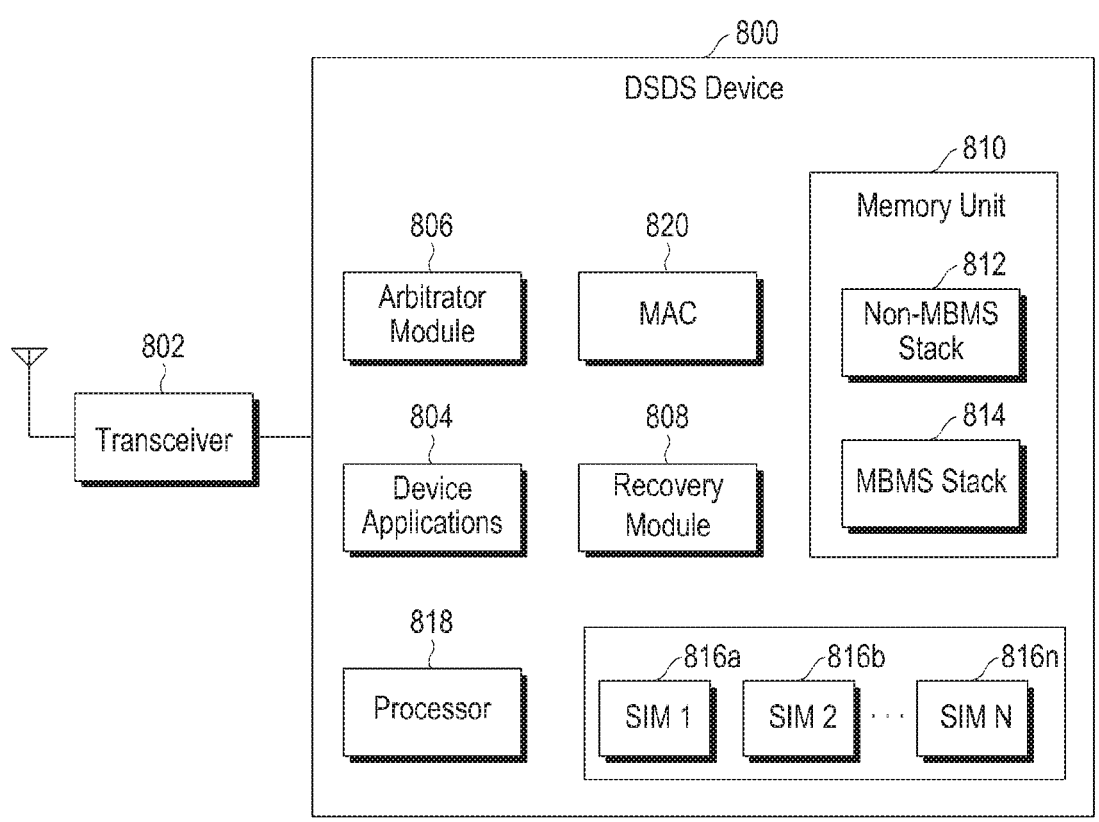
FIG. 8 is a schematic block diagram illustrating a multi-SIM dual SIM dual standby (DSDS) device that handles Radio Frequency (RF) resources between a Multimedia Broadcast Multicast Services (MBMS) stack and a non-MBMS stack, according to an example embodiment.

FIG. 8 is a schematic block diagram illustrating a multi-SIM dual SIM dual standby (DSDS) device 800 that handles Radio Frequency (RF) resources between a Multimedia Broadcast Multicast Services (MBMS) stack and a non-MBMS stack, according to an example embodiment of the present invention. According to the block diagram, DSDS device 800 comprises a transceiver 802, one or more device applications 804, an arbitrator module 806, a processor 808, a memory 810, wherein the memory 810 comprises a non-MBMS stack 812, and a MBMS stack 814, one or more SIMs (SIM 1 816*a*, SIM 2 816*b*, . . . SIM N 816*n*), a recovery module 818 and a medium access control (MAC) 820.

According to the present invention, transceiver 802 receives and transmits signals between DSDS device 800 and other devices over a network (not shown). In an example embodiment of the present invention, transceiver 802 comprises of one or more antennas configured to receive and transmit data packets associated with one or more SIMs of DSDS device 800. One or more device applications 804 are installed, may be accessed over a graphical user interface (GUI) of DSDS device 800, and are executed using processor 808.

According to the present invention, arbitrator module 806 receives a MBMS configuration from MBMS stack 814 and calculates one or more available RF occasions and a duration of each of the one or more RF occasions based on the MBMS configuration. Further, arbitrator module 806 employs a priority mechanism comprising one of MBMS scheduling information, a MBMS control channel and MBMS traffic in a desired order to enable efficient reception.

Further, recovery module 818 receives control of RF resources from non-MBMS stack 812, determines a decode miss for the MSI while the RF resources are tuned away based on timing information, and sends a signal indicating the decode miss for the MSI to MAC 820 along with a current system timing.

Further, MBMS stack 814 stores information associated with the MBMS processes and non-MBMS stack 812 stores information associated with the non-MBMS processes. The information stored by non-MBMS stack 812 and MBMS stack 814 are described above and thus not described here to avoid repetition. Further, memory 810 may be operatively coupled to non-MBMS stack 812 and MBMS stack 814 and store information associated to them. Further, recovery module 818 updates the non-MBMS stack information on the availability of the one or more RF occasions along with the corresponding durations in absolute time, and receives information from non-MBMS stack 812 on completion of operations utilizing the one or more available RF occasions.

In the preceding detailed description of the example embodiments of the invention, reference is made to the accompanying drawings that form a part hereof, and in which are shown by way of illustration example embodiments in which the invention may be practiced. These example embodiments are described in sufficient detail to enable those skilled in the art to practice the invention, and it is to be understood that other example embodiments may be utilized and that changes may be made without departing from the scope of the present invention. The preceding detailed description is, therefore, not to be taken in a limiting sense, and the scope of the present invention is defined only by the appended claims.

What is claimed is:

1. A method for handling Radio Frequency (RF) resources between a Multimedia Broadcast Multicast Services (MBMS) stack and a non-MBMS stack in a Dual SIM Dual Standby (DSDS) device, the method comprising:
   receiving, by a processor of the DSDS device, an MBMS configuration from the MBMS stack, the MBMS stack and the non-MBMS stack being including in a memory of the DSDS device;
   receiving Discontinuous Reception (DRX) parameters and information regarding an unscheduled Multicast Traffic Channel (MTCH) service, the DRX parameters including DRX and eDRX cycle information;
   calculating, by the processor, one or more available RF occasions and one or more durations based on the MBMS configuration, the DRX parameters and the information regarding the unscheduled MTCH service, each of the one or more durations corresponding to a respective available RF occasion among the one or more available RF occasions;

updating, by the processor, information corresponding to the non-MBMS stack based on the one or more available RF occasions and the one or more durations in absolute time; and receiving, by the processor, information from the non-MBMS stack based on completion of an operation utilizing the one or more available RF occasions.

2. The method of claim 1, wherein the calculating calculates the one or more available RF occasions using a priority based on at least one of MBMS scheduling information, a MBMS control channel or MBMS traffic in a desired order.

3. The method of claim 1, wherein the MBMS configuration includes at least one of:

parameters for cross-layer communication between a MBMS based device application and a modem for MBMS;

user service Quality of Experience (QoE) parameters including at least delay, latency and video quality; and application or service level configuration parameters including at least one of forward error correction capability, file repair capability, service type, and unicast connection capability.

4. The method of claim 1, wherein the calculating calculates the one or more available RF occasions based on MBMS scheduling information in response to a Multicast Channel (MCH) Scheduling Information (MSI) decode miss occurring due to RF resources tuning away.

5. The method of claim 3, further comprising:

obtaining control over RF resources from the non-MBMS stack;

determining a decode miss for MSI while the RF resources are tuned away based on timing information; and sending a signal indicating the decode miss for the MSI to a Medium Access Control (MAC) along with a current system timing such that the MAC, generates anew MSI using a provided MSI configuration, and provides MBMS scheduling information to decode MBMS data packets based on the current system timing and presently active services, receiving a request from the MBMS stack for RF resources based on the provided MSI configuration.

6. The method of claim 3, further comprising:

obtaining control over one or more RF resources from the non-MBMS stack;

determining whether a present system time has crossed over a MCH scheduling information (MSI) occurrence;

indicating to a MAC a loss of MSI in response to determining the present system time has crossed over the MSI occurrence such that the MAC discards decoded MBMS data packets not pertaining to interested services;

receiving a request from the MBMS stack for RF resources for an available scheduling period;

decoding the MBMS data packets until anew MSI configuration is received from the MAC; and processing the MBMS data packets related to the interested services.

7. The method of claim 3, further comprising:

determining whether a decode miss occurs for MSI while the RF resources are tuned away based on current timing information in response to obtaining control of the RF resources from the non-MBMS stack; and sending a signal indicating the decode miss for the MSI to a MAC along with current system timing in response to determining the decode miss occurs such that the MAC, outputs MBMS scheduling information for decoding MBMS data packets based on the current system timing and presently active services, receives decoded MBMS data packets, discards the MBMS data packets if the decoded MBMS data packets are not for any of the presently active services, determines suitability of an applied MSI based on a threshold number of discards, the applied MSI being a pre-stored MSI, outputs an indication to apply blind decoding for MBMS data in response to a number of discards being more than the threshold number of discards, and deletes the applied MSI in response to determining the applied MSI is unsuitable.

8. The method of claim 3, further comprising:

informing a network regarding MBMS operation status;

transmitting an MSI information request message to the network in response to a decode miss of MSI while the RF resources are tuned away being identified; and receiving MSI information over a unicast channel from the network.

9. The method of claim 3, further comprising:

computing, by a first stack, which is receiving MBMS data packets timing information of a next scheduled MSI occasion of a current service;

releasing, by the first stack, RF resources for use by a second stack during an MBMS idle period;

providing, by the first stack, updated timing information associated with the next scheduled MSI occasion to the second stack; and releasing, by the second stack, the RF resources before expiry of the MSI occasion, wherein each of the first stack and the second stack is one of the MBMS stack and the non-MBMS stack.

10. The method of claim 3, further comprising:

receiving a reserved value from a MAC indicative of a current running service in response to the current running service not being scheduled for an MSI periodicity.

11. The method of claim 8, further comprising at least one of:

using at least one of a new MSI value computed by a MAC or a blind decode method in response to an MSI being missed at an MSI occasion; or using the blind decode method in response to the MSI being missed in following-up an MBMS scheduling period, wherein the blind decode method is stopped and the RF resources released for another stack operation in response to the MSI indicating an un-scheduled MTCH occasion when the blind decode method is used.

12. A Dual SIM Dual Standby (DSDS) device for handling Radio Frequency (RF) resources, the device comprises:

a memory including, a Multimedia Broadcast Multicast Services (MBMS) stack configured to store an MBMS configuration, a non-MBMS stack configured to store a non-MBMS configuration, and one or more subscriber identity modules (SIMs); and a transceiver configured to transmit and receive signals and data packets associated with the MBMS stack and non-MBMS stack; and a processor configured to execute computer-readable instructions to, receive the MBMS configuration from the MBMS stack, receive Discontinuous Reception (DRX) parameters and information regarding an unscheduled Multicast Traffic Channel (MTCH) service, the DRX parameters including DRX and eDRX cycle information, calculate one or more available RF occasions and one or more durations based on the MBMS configuration, the DRX parameters and the information regarding the unscheduled MTCH service, each of the one or more durations corresponding to a respective RF occasion among the one or more available RF occasions, update non-MBMS stack information based on the one or more available RF occasions and the one or more durations in absolute time, receive information from the non-MBMs stack based on completion of an operation utilizing the one or more available RF occasions, obtain control of the RF resources from the non-MBMS stack, determine a decode miss for an MSI while the RF resources are tuned away based on timing information, and send a signal indicating the decode miss for the MSI to a Medium Access Control (MAC) along with current system timing.

13. A method performed by a Dual SIM Dual Standby (DSDS) device having a Multimedia Broadcast Multicast Services (MBMS) stack and a non-MBMS stack, comprising:

calculating, by a processor of the DSDS device, one or more available RF occasions based on an MBMS configuration of the MBMS stack;

obtaining, by the processor, control over Radio Frequency (RF) resources from the non-MBMS stack after completion of an operation utilizing the one or more available RF occasions;

determining, by the processor, whether a Multicast Channel (MCH) Scheduling Information (MSI) decode miss has occurred while the RF resources are tuned away based on system timing information;

sending, by the processor, a signal to a Medium Access Control (MAC) in response to determining the MSI decode miss has occurred, the signal including an indication that the MSI decode miss has occurred and providing current system timing information;

receiving, by the processor, a decode configuration signal from the MAC; and decoding, by the processor, a MBMS channel packet based on the decode configuration signal to obtain a decoded MBMS channel packet.

14. The method of claim 13, wherein the decode configuration signal includes a new MSI configuration.

15. The method of claim 13, wherein the decode configuration signal includes an instruction to blindly decode the MBMS channel packet.

16. The method of claim 13, further comprising:
receiving a new MSI configuration from the MAC; and
decoding the MBMS channel packet based on the new MSI configuration.

17. The method of claim 13, further comprising:
transmitting the decoded MBMS channel packet to the MAC.

18. The method of claim 13, wherein the determining determines whether the MSI decode miss has occurred prior to the RF resources tuning away.

* * * * *